United States Patent
Park

(10) Patent No.: US 9,298,288 B2
(45) Date of Patent: Mar. 29, 2016

(54) DRIVING APPARATUS OF DISPLAY PANEL AND DISPLAY DEVICE INCLUDING THE SAME

(71) Applicant: Samsung Display Co., Ltd., Yongin-si, Gyeonggi-do (KR)

(72) Inventor: Sung-Cheon Park, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 415 days.

(21) Appl. No.: 13/705,108

(22) Filed: Dec. 4, 2012

(65) Prior Publication Data

US 2014/0043314 A1 Feb. 13, 2014

(30) Foreign Application Priority Data

Aug. 8, 2012 (KR) .......................... 10-2012-0086931

(51) Int. Cl.
*G06F 3/038* (2013.01)
*G09G 5/00* (2006.01)
*G09G 3/20* (2006.01)

(52) U.S. Cl.
CPC ........ *G06F 3/038* (2013.01); *G09G 3/20* (2013.01); *G09G 2330/025* (2013.01); *G09G 2330/028* (2013.01); *G09G 2330/04* (2013.01); *G09G 2330/08* (2013.01)

(58) Field of Classification Search
USPC .......................................................... 345/212
See application file for complete search history.

(56) References Cited

U.S. PATENT DOCUMENTS

| | | | |
|---|---|---|---|
| 2007/0064454 A1* | 3/2007 | Chen et al. | 363/49 |
| 2008/0225036 A1* | 9/2008 | Song et al. | 345/213 |
| 2008/0246702 A1* | 10/2008 | Lee et al. | 345/77 |
| 2011/0181625 A1* | 7/2011 | Shin et al. | 345/690 |
| 2012/0050249 A1* | 3/2012 | Jin et al. | 345/212 |

FOREIGN PATENT DOCUMENTS

| | | |
|---|---|---|
| KR | 10-2001-0008894 A | 2/2001 |
| KR | 10-0642918 | 11/2006 |
| KR | 10-1015090 B1 | 2/2011 |

OTHER PUBLICATIONS

Korean Patent Abstract Publication No. 10-2006-0075439 dated Jul. 4, 2006 issued in corresponding KR 10-0642918, 2 pages.

\* cited by examiner

*Primary Examiner* — Long D Pham
(74) *Attorney, Agent, or Firm* — Lewis Roca Rothgerber Christie LLP

(57) ABSTRACT

A driving apparatus of a display panel comprises a display panel for displaying an image according to an image signal; a DC-DC converter configured to output a voltage supplied from an external power source as a driving power source voltage for driving the display panel; a signal controller configured to generate a power supply enable signal for controlling an operation of the DC-DC converter and transfer it to the DC-DC converter; and a driving controller configured to determine an operation of the DC-DC converter according to a state of the driving power source voltage by receiving the driving power source voltage and comparing the received driving power source voltage with a pulse voltage of the power supply enable signal, and drive the DC-DC converter by adjusting the power supply enable signal in case the DC-DC converter is not operated.

19 Claims, 5 Drawing Sheets

DRIVING APPARATUS OF DISPLAY PANEL AND DISPLAY DEVICE INCLUDING THE SAME

CROSS-REFERENCE TO RELATED APPLICATION

This application claims priority to and the benefit of Korean Patent Application No. 10-2012-0086931, filed in the Korean Intellectual Property Office on Aug. 8, 2012, the entire content of which is incorporated herein by reference.

BACKGROUND

1. Field

The following description relates to a driving apparatus of a display panel and a display device including the driving apparatus.

2. Description of the Related Art

Flat display elements, by which a large, light, and thin image display device may be easily implemented and a high image quality may be achieved, have been already commercially available and mass produced for the market. Flat display devices, such as a liquid crystal display (LCD), a plasma display panel (PDP), a vacuum florescent display device (VFD), and an organic light emitting diode (OLED) display are manufactured by using the flat display elements.

The flat panel display has been widely applied to a personal portable electronic device, for example, a mobile phone, a PDA, and a portable computer, due to easily implementing lightness, thinness, and a high image quality. Particularly, an organic light emitting diode (OLED) display, which is a self light-emitting element, displays an image by self-emitting light, so that a response speed thereof is fast at a speed of several tens of nanoseconds (ns), and has a wide view angle and a high contrast range, thereby attracting attention as a next generation display.

As a display panel of light (and a thin flat display device including the same) becomes thin, it becomes difficult to control a driving of power applied to the display panel. That is, a short circuit may be generated in power applied to the display panel caused by the generation of a crack from external impact or a problem of power supply, so that overcurrent flows in the display panel and a temperature increases, thereby causing the severe problem of burning the display panel.

Accordingly, a display device generally needs to include a circuit for diagnosing a short circuit from driving power and protecting a display panel from a problem caused by the short.

However, when a DC-DC converter of a power supply is momentarily and intermittently shut down due to an operation of a short circuit protection circuit due to the generation of static electricity, or a set environment of a driving IC (instead of a continuous error or short circuit phenomenon of the power supply), it can be impossible to detect the short circuit and wake up the display device only by the power short circuit protection circuit.

Accordingly, it is necessary to control driving of the power supply by discriminating a continuous short circuit state due to an error from the power supply or a non-continuous state, such as an external impact or a shutdown state of a DC-DC converter resulting from simple generation of static electricity.

The above information disclosed in this Background section is only for enhancement of understanding of the background of the invention and therefore it may contain information that does not form the prior art that is already known in this country to a person of ordinary skill in the art.

SUMMARY

An aspect of an embodiment of the present invention is directed toward a display device capable of solving a problem caused by a momentary driving stoppage by detecting a state of a DC-DC converter of power supply, as well as protecting a display panel from a continuous short circuit phenomenon by designing a circuit suitable for driving control of a driving power source supplied to the display panel.

An exemplary embodiment of the present invention provides a driving apparatus of a display panel, including: a display panel for displaying an image according to an image signal; a DC-DC converter configured to output a voltage supplied from an external power source as a driving power source voltage for driving the display panel; a signal controller configured to generate a power supply enable signal for controlling an operation of the DC-DC converter and transfer the generated power supply enable signal to the DC-DC converter; and a driving controller configured to determine an operation of DC-DC converter according to a state of the driving power source voltage by receiving the driving power source voltage and comparing the received driving power source voltage with a pulse voltage of the power supply enable signal, and drive the DC-DC converter by adjusting the power supply enable signal in a case in which the DC-DC converter is not operated.

The driving controller may compare the input driving power source voltage with the pulse voltage of the power supply enable signal and determine the operation of the DC-DC converter according to a result value of the comparison.

The driving controller may adjust the pulse voltage of the power supply enable signal to a first level for turning off the driving of the DC-DC converter and then adjust the pulse voltage of the power supply enable signal to a second level for turning on the driving of the DC-DC converter to drive the DC-DC converter.

In this case, after the pulse voltage of the power supply enable signal is adjusted to the second level, black data may be inserted in an image signal transferred during at least one frame.

The adjustment of the power supply enable signal may be performed at least one time before driving the DC-DC converter.

In one embodiment of the present invention, the driving controller includes a voltage detector including a comparator configured to compare the input driving power source voltage with the pulse voltage of the power supply enable signal and output the result value of the comparison; and a DC-DC converter driving controller configured to determine the operation of the DC-DC converter according to the result value of the comparison of the comparator, and adjust the pulse voltage of the power supply enable signal when the DC-DC converter is not operated.

In this case, the voltage detector may receive a detection operation signal for controlling an operation of the comparator, and the detection operation signal may be transferred with a voltage level for operating the comparator for a time period during which valid image data, except for the black data inserted for dividing the image in the image signal, is transferred to the display panel.

As another exemplary embodiment, the driving controller may include a voltage detector including a logic circuit calculator configured to calculate and output logic values of the input driving power source voltage and the pulse voltage of the power supply enable signal; and a DC-DC converter driving controller configured to determine the operation of the DC-DC converter according to the calculated result value, and adjust the pulse voltage of the power supply enable signal when the DC-DC converter is not operated.

In the present invention, the driving power source voltage includes a first power source voltage of a set or predetermined high level and a second power source voltage of a set or predetermined low level.

In this case, the driving controller receives the first power source voltage.

The driving controller may compare the first power source voltage of the set or predetermined high level with the pulse voltage of the power supply enable signal, and when the first power source voltage is lower than the pulse voltage, the driving controller may determine that the DC-DC converter is not operated.

Another exemplary embodiment of the present invention provides a display device, including: a display panel including a plurality of pixels for displaying an image according to an image signal; a scan driver configured to generate and transfer a plurality of scan signals for activating each of the plurality of pixels; a data driver configured to transfer an image data signal corresponding to the image signal to each of the plurality of activated pixels; a DC-DC converter configured to output a power source voltage for driving each of the plurality of pixels; a signal controller configured to generate and transfer a first control signal for controlling driving of the scan driver, a second control signal for controlling driving of the data driver, and a power supply enable signal for controlling driving of the DC-DC converter; and a driving controller configured to determine an operation of the DC-DC converter according to a state of the power source voltage by receiving the power source voltage and comparing the input power source voltage with a pulse voltage of the power supply enable signal, and drive the DC-DC converter by adjusting the power supply enable signal when the DC-DC converter is not operated.

According to the exemplary embodiment, the driving controller may be included in the signal controller.

The driving controller may adjust the pulse voltage of the power supply enable signal to a first level for turning off driving of the DC-DC converter when the DC-DC converter is not operated, and then adjust the pulse voltage of the power supply enable signal to a second level for turning on the driving of the DC-DC converter.

The adjustment of the power supply enable signal may be performed at least one time before driving the DC-DC converter.

In the display device of the present invention, the driving controller may include a voltage detector including a comparator configured to compare the input power source voltage with the pulse voltage of the power supply enable signal and output a result value of the comparison; and a DC-DC converter driving controller configured to determine an operation of the DC-DC converter according to the result value of the comparison of the comparator, and adjust the pulse voltage of the power supply enable signal when the DC-DC converter is not operated.

The voltage detector may receive a detection operation signal for controlling an operation of the comparator, and the detection operation signal may be transferred with a voltage level for operating the comparator for a time period during which valid image data, except for the black data inserted for dividing the image in the image signal, is transferred to the display panel.

The image data signal transferred during at least one frame after the driving controller adjusts the pulse voltage of the power supply enable signal may include black data.

As another exemplary embodiment, the driving controller may include a voltage detector including a logic circuit calculator configured to calculate and output logic values of the input power source voltage and the pulse voltage of the power supply enable signal; and a DC-DC converter driving controller configured to determine an operation of the DC-DC converter according to the result value of the calculation of the logic circuit calculator, and adjust the pulse voltage of the power supply enable signal when the DC-DC converter is not operated.

The power source voltage may include a first power source voltage of a set or predetermined high level and a second power source voltage of a set or predetermined low level, and the driving controller may compare the first power source voltage of the set or predetermined high level with the pulse voltage of the power supply enable signal, and when the first power source voltage is lower than the pulse voltage, the driving controller may determine that the DC-DC converter is not operated.

Accordingly, an embodiment of the present invention may provide a circuit capable of protecting a display panel and controlling so that a DC-DC converter of power supply is normally operated when power supply is momentarily stopped due to abnormality of a peripheral environment, such as generation of static electricity, while solving a problem of the continuous power supply due to a short circuit in a display device, and a display device including the circuit.

Further, an embodiment of the present invention provides a display device including a control circuit of power supply capable of automatically detecting an intermittent and momentary shutdown state of a DC-DC converter and automatically waking up the DC-DC converter, so that it is possible to remove inconvenience in that a user arbitrarily resets driving of a power source of a display device in a mobile environment, thereby improving convenience.

DETAILED DESCRIPTION OF THE EMBODIMENTS

Figure 1:
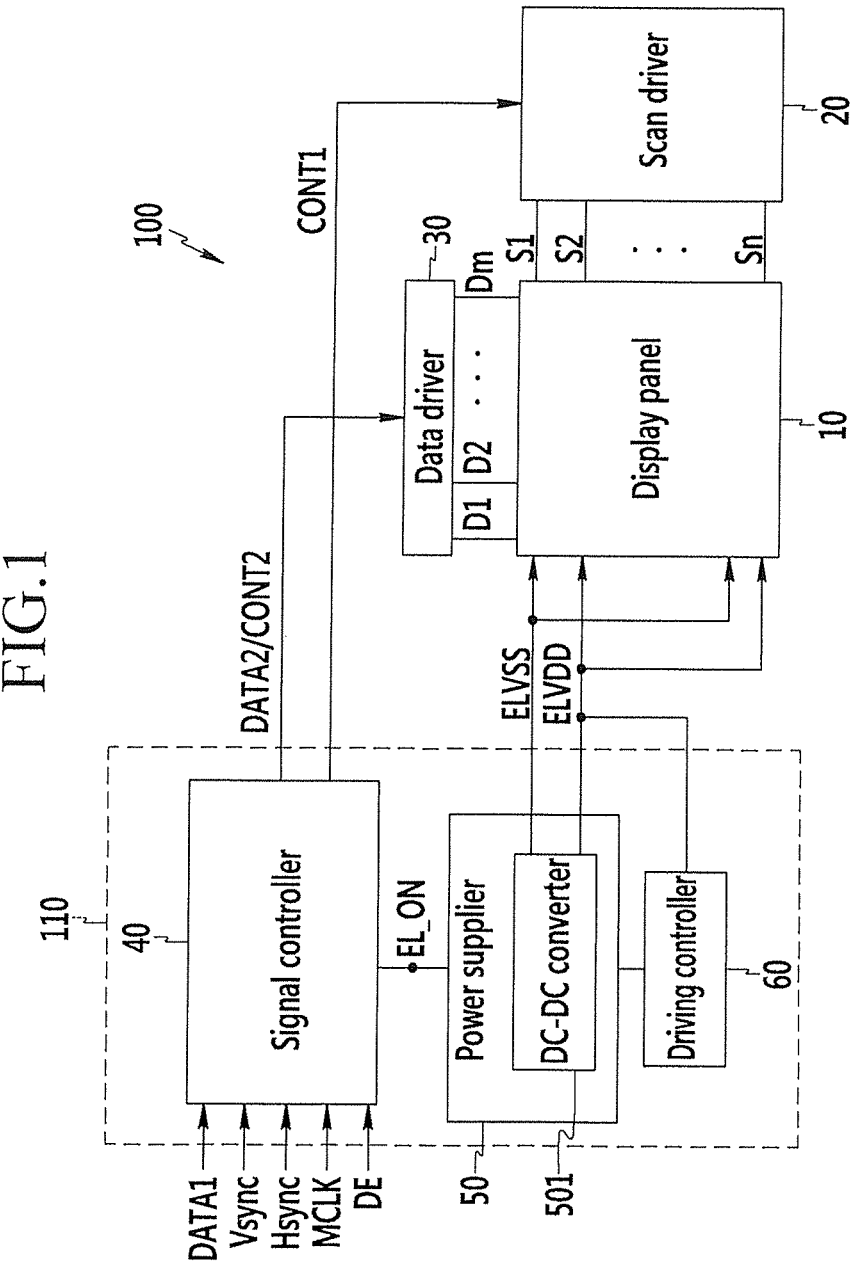
FIG. 1 is a block diagram schematically illustrating a configuration of a display device according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Throughout this specification and the claims that follow, when it is described that a first element is "coupled" to a second element, the first element may be "directly coupled" to the second element or "electrically coupled" to the second element through a third element. Further, unless explicitly described to the contrary, the word "comprise" and variations such as "comprises" or "comprising", will be understood to imply the inclusion of stated elements but not the exclusion of any other elements.

FIG. 1 is a block diagram schematically illustrating a configuration of a display device according to an exemplary embodiment of the present invention.

Referring to FIG. 1, a display device 100 according to an exemplary embodiment of the present invention includes a display panel 10, a scan driver 20, a data driver 30, and a driving circuit unit 110.

The driving circuit unit 110 is provided on a PCB substrate and is configured to adjust driving and control operations of the display panel 10, the scan driver 20, and the data driver 30. To this end, the driving circuit unit 110 includes a plurality of control circuits, and particularly, a signal controller 40, a power supplier 50, and a driving controller 60.

The display panel 10 includes a plurality of pixels including display elements of an image, and displays a corresponding image according to an image data signal according to an external image signal.

The plurality of pixels is connected to the scan driver 20 through a plurality of scan lines S1 to Sn, and is connected to the data driver 30 through a plurality of data lines D1 to Dm. Further, the display panel 10 receives a driving voltage through the power supplier 50 so as to display an image by activating the operation of the pixels. The driving voltage includes a first power source voltage (ELVDD) that is a high potential voltage and a second power source voltage (ELVSS) that is a low potential voltage.

The scan driver 20 generates a plurality of scan signals under the control of a scan control signal CONT1 transferred from the signal controller 40 and sequentially transfers the generated scan signals to each of the plurality of scan lines S1 to Sn. The plurality of scan signals are transferred to the corresponding pixels of the display panel 10 through the corresponding scan lines to activate the operation of the pixels.

The data driver 30 sequentially supplies an image data signal DATA2 to each of the plurality of data lines D1 to Dm under the control of a data driving control signal CONT2 transferred from the signal controller 40. The image data signal DATA2 is a data signal generated by performing a brightness correction or an image processing according to other configuration of the display panel on an external image signal DATA1 transferred to the signal controller 40 and transferred by the signal controller 40.

The image data signal DATA2 is transferred with a data voltage corresponding to each pixel of the display panel 10 activated by the scan signal. Then, the display element included in each pixel emits light corresponding to the data voltage according to the image data signal to display an image.

The signal controller 40 receives the image signal DATA1, a vertical synchronization signal Vsync, a horizontal synchronization signal Hsync, a data enable signal DE, and a clock signal MCLK from the outside.

The signal controller 40 controls operation timings of the scan driver 20, the data driver 30, and the power supplier 50 by using timing signals, such as the vertical synchronization signal Vsync, the horizontal synchronization signal Hsync, the data enable signal DE, and the clock signal MCLK. Particularly, the signal controller 40 may generate the scan control signal CONT1 for controlling operation timings of the generation and the supply of the scan signal of the scan driver 20. Further, the signal controller 40 may generate the data driving control signal CONT2 for controlling an operation timing of transferring a data voltage according to the image data signal of the data driver 30. In addition, the signal controller 40 may generate a power supply enable signal EL_ON for controlling an operation timing of supplying a power source voltage for driving the display panel by the power supplier 50.

The power supply enable signal EL_ON is a signal for initiating an operation and maintaining driving of the power supplier 50.

In addition, the signal controller 40 generates the image data signal DATA2 by performing an appropriate image process and processing, such as brightness correction and color coordinates correction, on the image signal DATA1 received from the outside and transfers the generated image data signal DATA2 to the data driver 30.

In the display device of the present invention according to the exemplary embodiment of FIG. 1, the signal controller 40 is separately constituted from the driving controller 60, but is not limited thereto, and the driving controller 60 for controlling the supply of power to the display panel may be included in the signal controller 40.

The driving controller 60 may wake up the operation of the power supplier 50 when the operation of the power supplier 50 is momentarily stopped by controlling a pulse voltage of the power supply enable signal EL_ON transferred to the power supplier 50.

The power supplier 50 generates and transfers a driving power source voltage for driving the display panel 10 according to the timing control by the signal controller 40. Here, the driving power source voltage may be the first power source voltage ELVDD of a high potential (e.g., a high voltage level) and the second power source voltage ELVSS of a low potential (e.g., a low voltage level), and the driving power source voltage is applied through the power lines connected to the respective pixels of the display panel 10.

According to the exemplary embodiment, the power supplier 50 may include a voltage distributor configured to distribute and transfer a voltage transferred from an external power source; and a DC-DC converter configured to generate the distributed voltage as an analog voltage at a set or predetermined voltage level for driving the display panel again and transfer the generated voltage. Further, according to another exemplary embodiment, the power supplier 50 may further include a voltage generator configured to generate a reference voltage for controlling the driving of the respective pixels of the display panel and an initialization voltage for initializing a data voltage and transfer the generated voltage to the display panel. However, as illustrated in FIG. 1, the power supplier 50 may include only the DC-DC converter 501 configured to generate a voltage transferred from an external power source as an analog voltage at a set or predetermined voltage level and transfer the generated analog voltage.

The DC-DC converter 501 generates an analog voltage for driving the display panel 10 and transfers the generated analog voltage to the display panel 10 through the power lines, and an operation thereof is initiated according to the power supply enable signal (EL_ON) transferred from the signal controller 40. When the power supply enable signal (EL_ON) is applied with a voltage level for driving the DC-DC converter 501, the DC-DC converter 501 generates and transfers the driving power source voltage ELVDD/ELVSS for driving the display panel 10 by receiving the voltage from an external power source.

The display device according to the exemplary embodiment of the present invention includes the driving controller 60 for detecting and controlling power supply, and the driving controller 60 detects an operation state of the power supplier 50 and wakes up the power supplier 50 when the power supplier 50 is in a momentary off-state. Particularly, the driving controller 60 detects an on/off operation of the DC-DC converter 501 included in the power supplier 50 within the driving circuit unit 110, and detects a voltage level of the power supply enable signal EL_ON transferred from the signal controller 40.

A comparable display device transfers only an operation initiation signal to a DC-DC converter of a driving circuit unit, and controls on/off of the DC-DC converter according to a wake-up sequence of the driving circuit unit. Accordingly, the comparable display device cannot detect an on/off state of the DC-DC converter in real time.

When the DC-DC converter is turned off due to an external environment factor of a driving set, such as generation of static electricity, the comparable display device cannot detect the off-state of the DC-DC converter, thereby failing to wake up the DC-DC converter.

The driving controller 60 of the display device according to the exemplary embodiment of the present invention detects an operation of a short circuit protection circuit and an over voltage protection circuit due to a short circuit, or detects a case in which the DC-DC converter is temporarily shut down by a set environment factor, such as generation of static electricity, regardless of the power supply enable signal EL_ON. That is, the driving controller 60 detects an abnormal state (in which the DC-DC converter 501 is shut down) even when the driving circuit unit 110 normally operates so that the operation of the power supplier 50 is in an on-state by the power supply enable signal EL_ON.

A short circuit protection circuit of the comparable display device determines a short circuit by a potential of an output voltage (driving power source voltage) regardless of existence or non-existence of the operation of the driving circuit unit 110, and when it is determined that the short circuit is generated, the short circuit protection circuit directly shuts down the DC-DC converter without driving a screen of the display panel. In this state, the shut-down DC-DC converter is not woken up (unless a user resets the driving circuit unit).

The driving controller 60 of the display device according to the exemplary embodiment of the present invention may recognize an on/off operation of the DC-DC converter 501 by measuring a potential of the driving power source voltage DLVDD/ELVSS generated in the power supplier 50. The driving controller 60 according to the exemplary embodiment of the present invention of FIG. 1 may detect a voltage level of the first power source voltage ELVDD applied from the DC-DC converter 501 to the display panel 10 through the power lines. Accordingly, the driving controller 60 detects a case in which the driving of the DC-DC converter 501 is momentarily turned off due to a temporal error or failure even though the power supply enable signal EL_ON is transferred in an on-state by which the DC-DC converter is operatable.

In this case, the driving controller 60 drives the DC-DC converter 501, which is momentarily shut down, by re-adjusting (resetting) the voltage level of the power supply enable signal EL_ON.

Figure 2:
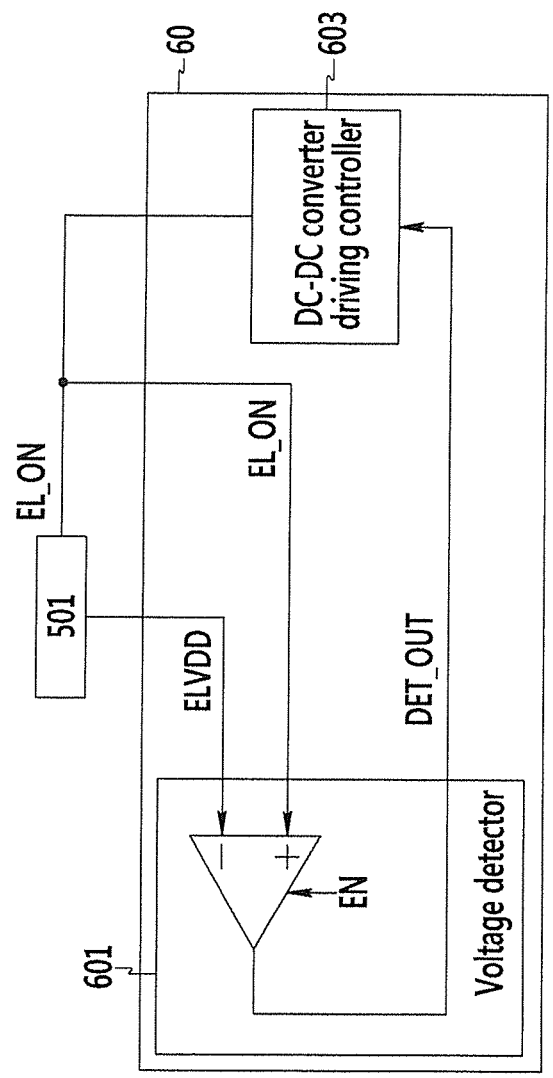
FIG. 2 is a diagram schematically illustrating a configuration of a circuit of a driving controller in the display device of FIG. 1 according to an exemplary embodiment of the present invention.
Figure 3:
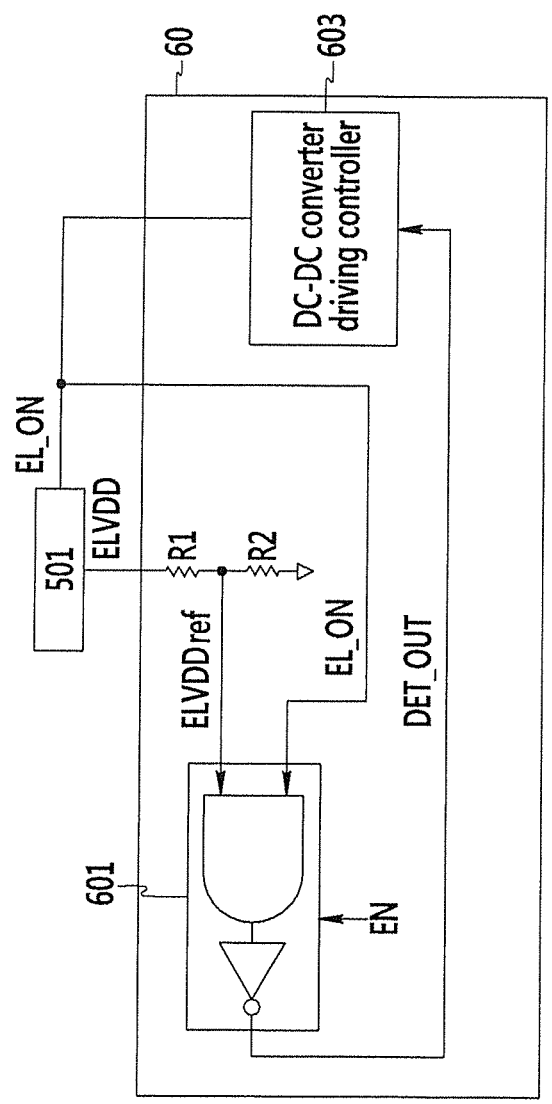
FIG. 3 is a diagram schematically illustrating a configuration of a circuit of a driving controller in the display device of FIG. 1 according to another exemplary embodiment of the present invention.

The circuit configuration and the function performed by each constituent means of the driving controller 60 according to the exemplary embodiment are illustrated in FIGS. 2 and 3 in more detail.

As described above, the power supplier 50 of the display device of FIG. 1 includes the DC-DC converter 501 configured to control the driving of the power supply by receiving the power supply enable signal EL_ON.

Referring to FIGS. 2 and 3, the driving controller 60 includes a voltage detector 601 and a DC-DC converter driving controller 603.

The voltage detector 601 of FIG. 2 includes a comparator configured to compare the first power source voltage ELVDD output from the DC-DC converter 501 with a voltage in a current state of the power supply enable signal EL_ON for driving the DC-DC converter 501. Particularly, the voltage detector 601 includes the comparator including a first input terminal (− terminal) to which the first power source voltage ELVDD output from the DC-DC converter 501 is input, a second input terminal (+ terminal) to which a pulse voltage of the power supply enable signal EL_ON is input, and an output terminal for outputting a result value DET_OUT obtained by comparing the first power source voltage ELVDD with the pulse voltage of the power supply enable signal EL_ON. An operation of the comparator of the voltage detector 601 is controlled in accordance with a detection operation signal EN.

The circuit configuration of the voltage detector 601 illustrated in FIG. 2 is simply one exemplary embodiment, and may include various suitable circuits configured to compare two voltages, that is, the first power source voltage ELVDD and the pulse voltage of the power supply enable signal EL_ON and output a set or predetermined comparison result value. Accordingly, the voltage detector 601 may include various suitable circuit configurations, such as a logic circuit, an inverting or non-inverting comparator, or a complex comparator.

In FIG. 3, as another exemplary embodiment of the circuit configuration of the voltage detector 601 of FIG. 1, the voltage detector 601 includes a logic circuit calculator. That is, the voltage detector 601 receives a logic high state 1 or a logic low state 0 according to a level of the first power source voltage ELVDD output from the DC-DC converter 501, and receives a logic high state 1 or a logic low state 0 according to a level of a currently input pulse voltage of the power supply enable signal EL_ON for driving the DC-DC converter 501 to perform a logic operation. An operation of the logic circuit calculator of the voltage detector 601 may be initiated by the detection operation signal EN.

The logic circuit calculator may be suitably modified according to a circuit design and is not specially limited, but the voltage detector 601 in the exemplary embodiment of FIG. 3 is designed as a NAND gate. In this case, a logic signal of the first power source voltage ELVDD input to the input terminal of the NAND gate of the logic circuit calculator may be a first power source voltage reference value ELVDDref set by the voltage distributor including a plurality of resistances R1 and R2.

Accordingly, when the first power source voltage reference value ELVDDref and the pulse voltage of the power supply enable signal EL_ON have a high potential (when a normal voltage is supplied), all of the first power source voltage reference value ELVDDref and the pulse voltage of the power supply enable signal EL_ON are input to the NAND gate as the logic high state value 1, so that the output result value DET_OUT is generated as the logic low state value 0 according to the calculation of the NAND gate.

However, when the first power source voltage reference value ELVDDref is in a low potential state (the abnormal voltage supply is stopped) due to the momentary shut down of the DC-DC converter 501 in a state in which the pulse voltage of the power supply enable signal EL_ON has a high potential, the first power source voltage reference value ELVDDref is input as the logic low state value 0 and the pulse voltage of the power supply enable signal EL_ON is input as the logic high state value 1 to the NAND gate of the voltage detector 601 of the FIG. 3, so that the output result value DET_OUT is generated as the logic high state value 1 according to the calculation of the NAND gate.

Further, referring to FIGS. 2 and 3, the driving controller 60 includes a DC-DC converter driving controller 603 configured to control a pulse voltage level of the power supply enable signal EL_ON for controlling the driving of the DC-DC converter 501 according to the result value DET_OUT obtained by comparing the two voltages output from the voltage detector 601.

When the DC-DC converter 501 is not woken up due to the generation of static electricity or the set environment factor even though the power supply enable signal EL_ON is transferred in the on-state for operating the DC-DC converter 501 during the driving of the display device of the present invention, the DC-DC converter driving controller 603 wakes up the DC-DC converter 501 by controlling the power supply enable signal EL_ON.

The function and the operation of each element of the driving controller 60 of FIGS. 2 and 3 will be separately described based on a normal state and an abnormal state of the power supply with reference to FIGS. 4 and 5 below.

Figure 4:
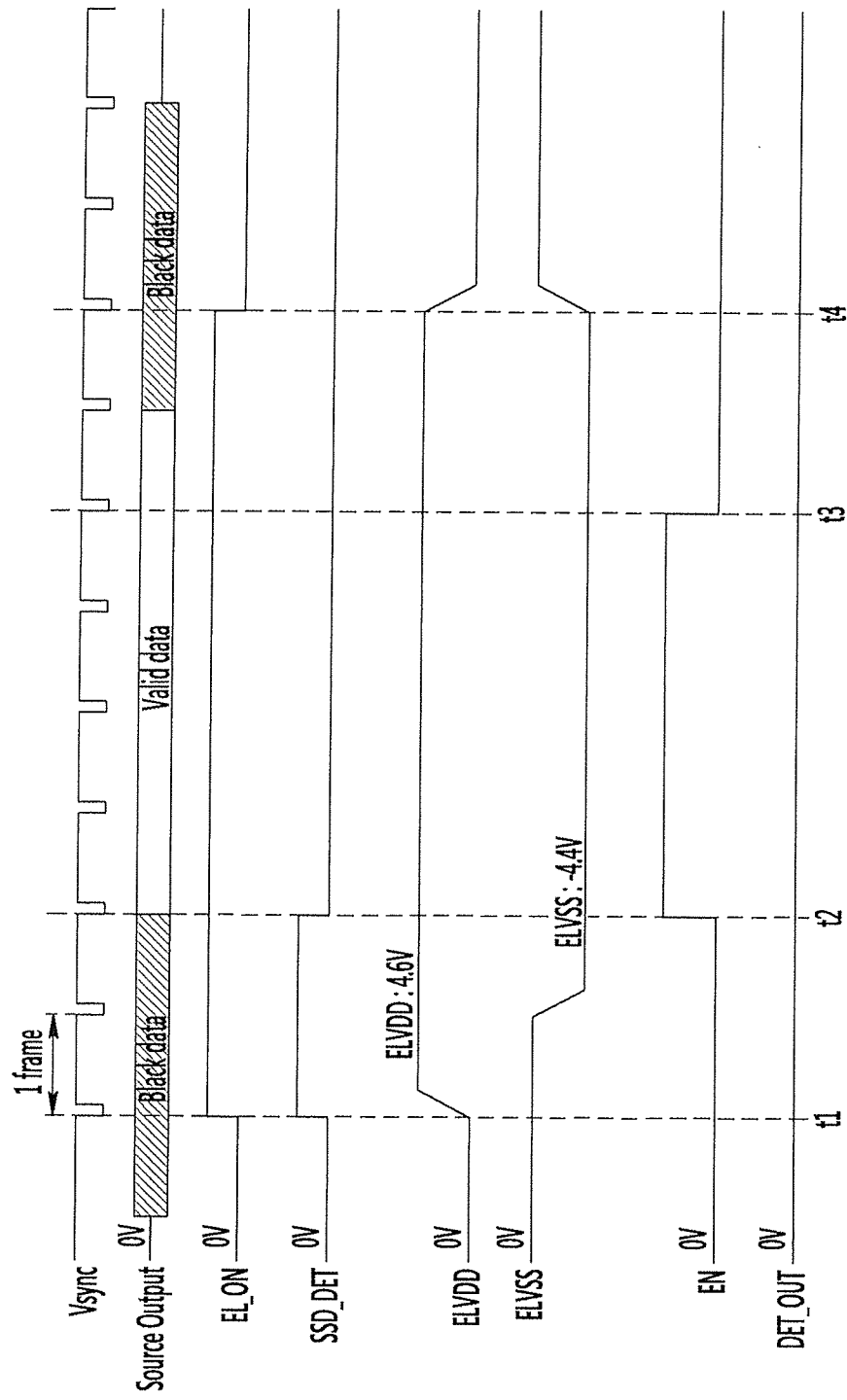
FIG. 4 is a diagram illustrating an operation of a circuit of a driving device of a display panel in a normal state of power supply and a continuous short circuit state according to an exemplary embodiment of the present invention.
Figure 5:
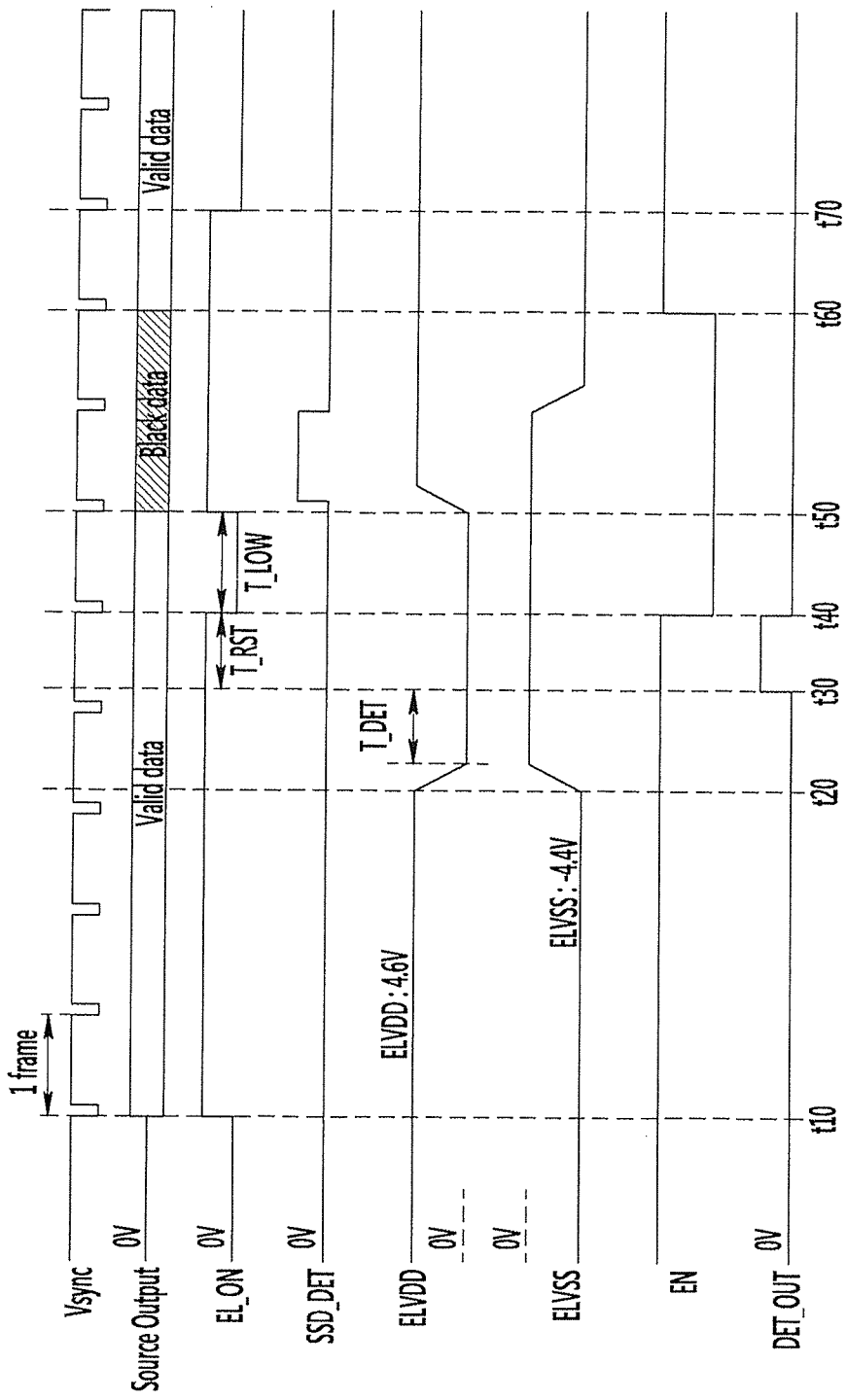
FIG. 5 is a diagram illustrating an operation of a circuit of a driving device of a display panel in a momentary stop state of power supply and a continuous short circuit state according to an exemplary embodiment of the present invention.

FIG. 4 is a timing diagram illustrating a circuit operation of the driving controller 60 of the display device according to the exemplary embodiment of the present invention in a normal state of the power supply and a continuous short circuit state, and FIG. 5 is a timing diagram illustrating a circuit operation of the driving controller 60 of the display device according to the exemplary embodiment of the present invention in a momentary stoppage state of the power supply and a continuous short circuit state.

In the driving timing diagrams of FIGS. 4 and 5, a plurality of image frames is divided by a vertical synchronization signal Vsync.

When the image data signal (image source (source output)) transferred from the data driver 30 is black data, the display panel 10 is in an off-state in which an image is viewed black, and when the image data signal is valid data, the display panel 10 is in an on-state to actually display an image. The valid data, which is image data except for black data inserted for dividing the frame among the image data signals transferred to the display panel, is image data signal actually displayed on the screen.

Before transferring the valid data, in the initial driving in which the black data is transferred and the screen is displayed black, the power supply enable signal EL_ON is transferred to the DC-DC converter 501 at time point t1. A pulse voltage of the transferred power supply enable signal EL_ON is a voltage for driving the DC-DC converter 501. It is assumed that an operation voltage of a signal for driving each circuit element in FIGS. 4 and 5 is a set or predetermined logic high voltage.

When the high level voltage pulse of the power supply enable signal EL_ON is transferred to the DC-DC converter 501, the DC-DC converter 501 is driven to supply power to the display elements of the display panel 10 so that an image is displayed while the respective display elements emit light.

The power supply enable signal EL_ON is transferred with the logic high voltage that is the operation voltage of the DC-DC converter 501 at time point t1, and a driving signal SSD_DET of a short circuit monitoring circuit for monitoring a short circuit between the driving power source voltages of the comparable display is transferred at the same time. The driving signal SSD_DET is applied with a high level voltage during a set or predetermined time t1 to t2 to drive the existing short circuit monitoring circuit. The short circuit monitoring circuit checks a short circuit between the driving power source voltages ELVDD and ELVSS, separately from the operation of the driving apparatus of the display panel of the present invention. When it is determined that the short circuit is generated, the DC-DC converter 501 is not driven until the valid data is transferred and an image is actually displayed on the screen.

When the short circuit monitoring circuit determines that the short circuit is not generated and the display panel is normally operated, the driving power source voltage is gradually generated (e.g., with a gradual slope with a set time period) to be at a set or predetermined level to be transferred to the display panel. That is, the first power source voltage ELVDD is generated as a high level voltage of 4.6 V from a ground voltage state of 0 V to be output. The second power source voltage ELVSS is generated as a low level voltage of −4.4 V from a ground voltage state of 0V to be output.

When each of the output voltages of the driving power source voltages is completely increased or decreased to maintain in a set or predetermined level, the detection operation signal EN for controlling the operation of the voltage detector 601 is shifted to a high level at time point t2. According to the exemplary embodiment of the present invention, whether the DC-DC converter is normally operated is determined by detecting the first power source voltage ELVDD among the driving power source voltages, so that the detection operation signal EN may be transferred with the high level voltage after the time point at which at least the first power source voltage ELVDD is completely increased to a high level voltage. For example, the detection operation signal EN may be shifted to a high level after at least two frames are passed after the time point at which the power supply enable signal EL_ON is transferred with a high level to operate the voltage detector 601.

In FIG. 4, the voltage detector 601 is operated from time point t2. That is, the comparator of the voltage detector 601 of FIG. 2 and the logic circuit calculator of the voltage detector 601 of FIG. 3 compares the first power source voltage ELVDD that is the output voltage of the DC-DC converter 501 with the pulse voltage of the power supply enable signal EL_ON. Then, the result value DET_OUT is output to the DC-DC converter driving controller 603.

When the display device is normally driven as illustrated in FIG. 4, the first power source voltage ELVDD is continuously output with a high level voltage, for example, 4.6 V, and the pulse voltage of the power supply enable signal EL_ON maintains a set or predetermined high level voltage, for example, 1.8 V. The comparator of the voltage detector 601 of FIG. 2 receives the first power source voltage ELVDD of 4.6 V through the inverting input terminal (− terminal) and the pulse voltage of the power supply enable signal EL_ON of 1.8 V through the non-inverting input terminal (+ terminal), and inverts a polarity of the first power source voltage ELVDD having a larger voltage value according to a result of the comparison to output the first power source voltage ELVDD as the result value DET_OUT of a low level voltage. The calculation process of the NAND gate in the logic circuit calculator of the voltage detector 601 has been already described in FIG. 3, so that the description according to the exemplary embodiment of FIG. 3 will be omitted.

In FIG. 4, the voltage detector 601 outputs the result value DET_OUT as the low level voltage until the detection operation signal EN is shifted to a low level at time point t3. This means that the DC-DC converter 501 is normally operated.

The detection operation signal EN is converted to a low level at time point t3 that is before the time point at which the black data is inserted so as to turn off the operation of the voltage detector 601. That is, when the voltage detector 601 is driven by the detection operation signal EN in the driving apparatus of the display panel of the present invention, the pulse voltage of the power supply enable signal EL_ON for driving the DC-DC converter 501 is at a high level.

When a short circuit is generated at time point t4, the first power source voltage ELVDD is decreased thereafter, and an abnormal short circuit state in which the second power source voltage ELVSS is increased is continued, the existing short circuit protection circuit is woken up, the pulse voltage of the power supply enable signal EL_ON is converted to a low level, and thus the DC-DC converter 501 is not driven.

However, there is a case in which only the DC-DC converter 501 is temporarily shut down as illustrated in FIG. 5, as well as a case in which an abnormal state of the power supplier is continuously maintained after time point t4 as illustrated in FIG. 4.

That is, when the DC-DC converter 501 is not temporarily operated due to the factor of the set environment or the generation of static electricity at time point t20 in the timing diagram of FIG. 5, the first power source voltage ELVDD is gradually decreased and the second power source voltage ELVSS is gradually increased while the high level of the pulse voltage of the power supply enable signal EL_ON transferred to the DC-DC converter 501 is maintained as is.

The pulse voltage of the power source supply enable signal EL_ON is shifted to a high level at time point t10, and the DC-DC converter is normally driven during a section from time point t10 to time point t20, so that the first power source voltage ELVDD of a high level and the second power source voltage of a low level are output. Accordingly, the detection operation signal EN has been already maintained at the high level during the section from time point t10 to time point t20 so that the voltage detector 601 of the driving controller 60 is operated.

Then, the comparator (the exemplary embodiment of FIG. 1) of the voltage detector 601 compares the first power source voltage ELVDD input to the inverting input terminal (− terminal) with the pulse voltage of the power supply enable signal EL_ON input to the non-inverting input terminal (+ terminal). For example, when the first power source voltage ELVDD is dropped from 4.6 V to a ground voltage of 0 V, the comparator of the voltage detector 601 non-inverts the pulse voltage of the power supply enable signal EL_ON that is a relatively large voltage according to the comparison between the first power source voltage ELVDD and the pulse voltage of the power supply enable signal EL_ON which maintains the voltage of 1.8 V as it is, to output a result value DET_OUT of the high level voltage at time point t30.

A time T_DET for the voltage detector 601 to determine a state of the abnormal momentary stoppage of the DC-DC converter may be set to at least one frame as illustrated in FIG. 5.

Then, the result value DET_OUT for the temporal stoppage state of the DC-DC converter maintains in the high level state for a time T_RST until the power supply enable signal EL_ON is dropped to a low level in order to wake up the DC-DC converter under the control of the DC-DC converter driving controller 603.

The time period T_RST until the power supply enable signal EL_ON is dropped to the low level may be synchronized with time point t40 at which the fastest vertical synchronization signal Vsync (which is transferred after the result value DET_OUT of the voltage detector is shifted to the high level) is shifted to a low level and terminated.

When the result value DET_OUT of the voltage detector is output in a high level during the time period T_RST from time point t30 to time point t40, the DC-DC converter driving controller 603 determines that the power supplier is in a momentary abnormal state, so that the DC-DC converter driving controller 603 maintains the pulse voltage of the power supply enable signal EL_ON in a low level during a time period T_LOW from time point t40 to time point t50 and then changes the pulse voltage of the power supply enable signal to a high level at time point t50. Accordingly, the DC-DC converter 501 which is not momentarily operated is woken up at time point t50.

As described above, an operation of dropping the pulse voltage of the power supply enable signal EL_ON during the time period from time point t40 to time point t50 and then increasing the pulse voltage of the power supply enable signal EL_ON to a high level, is referred to as a reset of the power supply enable signal EL_ON.

A time period T_LOW during which the low level of the power supply enable signal EL_ON is maintained in order to reset the power supply enable signal EL_ON may be at least one frame.

The detection operation signal EN is temporarily shifted to a low level after time point t40 at which the reset of the power supply enable signal EL_ON is initiated, so that the voltage detector 601 may not be operated.

Then, the black data needs to be inserted during at least one frame after the reset of the power supply enable signal EL_ON.

The number of times of the reset of the power supply enable signal EL_ON may be arbitrarily set, and is not specially limited. The DC-DC converter driving controller 603 of the driving controller 60 of the present invention may be set so as to be repeated with an enough time, and may be set so as to be automatically reset at least one time. The power supply enable signal EL_ON may be set so as to be repeated the set or predetermined number of times in the unit of one second. The reset of the power supply enable signal EL_ON of the DC-DC converter driving controller 603 may be stopped when the first power source voltage is completely increased to a high level voltage after time point t50.

The DC-DC converter 501 is woken up again at time point t50, so that the driving signal SSD_DET of the existing short circuit monitoring circuit may be applied in a high level again in order to activate the driving of the short circuit monitoring circuit during at least one frame after time point t50.

Here, the DC-DC converter 501 is woken up again, so that the DC-DC converter 501 outputs the first power source voltage ELVDD completely increased to a high level and the second power source voltage ELVSS completely decreased to a low level from time point t50.

The driving apparatus of the display panel is operated by the driving method of FIG. 5, so that the driving apparatus detects the operation state of the DC-DC converter in real time when the power supply enable signal EL_ON for driving the DC-DC converter is in a logic high state, thereby being capable of rapidly and automatically recovering the shutdown of the DC-DC converter due to the momentary abnormal reason.

The foregoing referenced drawings and detailed description of the present invention are all exemplary and used for explaining the present invention, and do not limit the meaning or the scope of the present invention defined in the claims. Accordingly, those skilled in the art will appreciate that various modifications and equivalent other embodiments may be possible. Further, a person of an ordinary skill in the art may omit a part of the constituent elements described in the present specification without deterioration of the performance thereof or may add a constituent element in order to improve the performance. In addition, a person of an ordinary skill in the art may change an order to the steps of the method described in the present specification according to a processing environment or equipment. Accordingly, the scope of the present invention will be defined by the accompanying claims and equivalents thereof, not the aforementioned exemplary embodiment.

<Description of symbols>

| | |
|---|---|
| 10: Display panel | 20: Scan driver |
| 30: Data driver | 40: Signal controller |
| 50: power supplier | 60: Driving controller |
| 100: Display device | 110: driving circuit unit |
| 501: DC-DC converter | 601: Voltage detector |
| 603: DC-DC converter driving controller | |

What is claimed is:

1. A driving apparatus of a display panel, comprising:
a display panel configured to display an image according to an image signal;
a DC-DC converter configured to output a voltage supplied from an external power source as a driving power source voltage for driving the display panel;
a signal controller configured to generate a power supply enable signal for controlling an operation of the DC-DC converter and transfer the generated power supply enable signal to the DC-DC converter; and
a driving controller configured to determine an operation of the DC-DC converter according to a state of the driving power source voltage by receiving the driving power source voltage and comparing the received driving power source voltage with a pulse voltage of the power supply enable signal, to determine that the DC-DC converter is not operated in response to the driving power source voltage being less than the pulse voltage, and to drive the DC-DC converter by adjusting the power supply enable signal in a case in which the DC-DC converter is not operated.

2. The driving apparatus of claim 1, wherein:
the driving controller is configured to
compare the driving power source voltage with the pulse voltage of the power supply enable signal, and determine the operation of the DC-DC converter according to a result value of the comparison.

3. The driving apparatus of claim 1, wherein:
the driving controller is configured to
adjust the pulse voltage of the power supply enable signal to a first level for turning off the driving of the DC-DC converter, and then adjust the pulse voltage of the power supply enable signal to a second level for turning on the driving of the DC-DC converter to drive the DC-DC converter.

4. The driving apparatus of claim 3, wherein:
after the pulse voltage of the power supply enable signal is adjusted to the second level, black data is inserted in an image signal transferred during at least one frame.

5. The driving apparatus of claim 1, wherein:
the adjustment of the power supply enable signal is performed at least one time before driving the DC-DC converter.

6. The driving apparatus of claim 1, wherein:
the driving controller comprises:
a voltage detector comprising a comparator configured to compare the driving power source voltage with the pulse voltage of the power supply enable signal and output a result value of the comparison; and
a DC-DC converter driving controller configured to determine the operation of the DC-DC converter according to the result value of the comparison of the comparator, and adjust the pulse voltage of the power supply enable signal when the DC-DC converter is not operated.

7. The driving apparatus of claim 6, wherein:
the voltage detector is configured to receive a detection operation signal for controlling an operation of the comparator, and
the detection operation signal is transferred with a voltage level for operating the comparator for a period during which valid image data, except for black data inserted for dividing the image in the image signal, is transferred to the display panel.

8. The driving apparatus of claim 1, wherein:
the driving controller comprises:
a voltage detector comprising a logic circuit calculator configured to calculate and output logic values of the driving power source voltage and the pulse voltage of the power supply enable signal; and
a DC-DC converter driving controller configured to determine the operation of the DC-DC converter according to the calculated result value, and adjust the pulse voltage of the power supply enable signal when the DC-DC converter is not operated.

9. The driving apparatus of claim 1, wherein:
the driving power source voltage comprises a first power source voltage of a high level and a second power source voltage of a low level, and
the driving controller is configured to receive the first power source voltage.

10. The driving apparatus of claim 1, wherein:
the driving power source voltage comprises a first power source voltage of a high level and a second power source voltage of a low level, and
the driving controller is configured to compare the first power source voltage of the high level with the pulse voltage of the power supply enable signal, and when the first power source voltage is lower than the pulse voltage, the driving controller is configured to determine that the DC-DC converter is not operated.

11. A display device, comprising:
a display panel comprising a plurality of pixels for displaying an image according to an image signal;
a scan driver configured to generate and transfer a plurality of scan signals for activating each of the plurality of pixels;
a data driver configured to transfer an image data signal corresponding to the image signal to each of the plurality of activated pixels;
a DC-DC converter configured to output a power source voltage for driving each of the plurality of pixels;

a signal controller configured to generate and transfer a first control signal for controlling driving of the scan driver, a second control signal for controlling driving of the data driver, and a power supply enable signal for controlling driving of the DC-DC converter; and a driving controller configured to determine an operation of the DC-DC converter according to a state of the power source voltage by receiving the power source voltage and comparing the power source voltage with a pulse voltage of the power supply enable signal, to determine that the DC-DC converter is not operated in response to the driving power source voltage being less than the pulse voltage, and to drive the DC-DC converter by adjusting the power supply enable signal when the DC-DC converter is not operated.

12. The display device of claim 11, wherein:
the driving controller is included in the signal controller.

13. The display device of claim 11, wherein:
the driving controller is configured to adjust the pulse voltage of the power supply enable signal to a first level for turning off driving of the DC-DC converter when the DC-DC converter is not operated, and then to adjust the pulse voltage of the power supply enable signal to a second level for turning on the driving of the DC-DC converter.

14. The display device of claim 13, wherein:
after the driving controller adjusts the pulse voltage of the power supply enable signal to the second level, the image data signal transferred during at least one frame includes black data.

15. The display device of claim 11, wherein:
the adjustment of the power supply enable signal is performed at least one time before driving the DC-DC converter.

16. The display device of claim 11, wherein:
the driving controller comprises:
a voltage detector including a comparator configured to compare the power source voltage with the pulse voltage of the power supply enable signal, and output a result value of the comparison; and a DC-DC converter driving controller configured to determine an operation of the DC-DC converter according to the result value of the comparison of the comparator, and adjust the pulse voltage of the power supply enable signal when the DC-DC converter is not operated.

17. The display device of claim 16, wherein:
the voltage detector is configured to receive a detection operation signal for controlling an operation of the comparator, and
the detection operation signal is transferred with a voltage level for operating the comparator for a period during which valid image data, except for black data inserted for dividing the image in the image signal, is transferred to the display panel.

18. The display device of claim 11, wherein:
the driving controller comprises:
a voltage detector comprising a logic circuit calculator configured to calculate and output logic values of the input power source voltage and the pulse voltage of the power supply enable signal; and a DC-DC converter driving controller configured to determine the operation of the DC-DC converter according to the calculated result value of the logic circuit calculator, and adjust the pulse voltage of the power supply enable signal when the DC-DC converter is not operated.

19. The display device of claim 11, wherein:
the power source voltage comprises a first power source voltage of a high level and a second power source voltage of a low level, and
the driving controller is configured to compare the first power source voltage of the high level with the pulse voltage of the power supply enable signal, and when the first power source voltage is lower than the pulse voltage, the driving controller is configured to determine that the DC-DC converter is not operated.

* * * * *